(No Model.)
A. J. FRANK.
SIFTER.
No. 255,275. Patented Mar. 21, 1882.
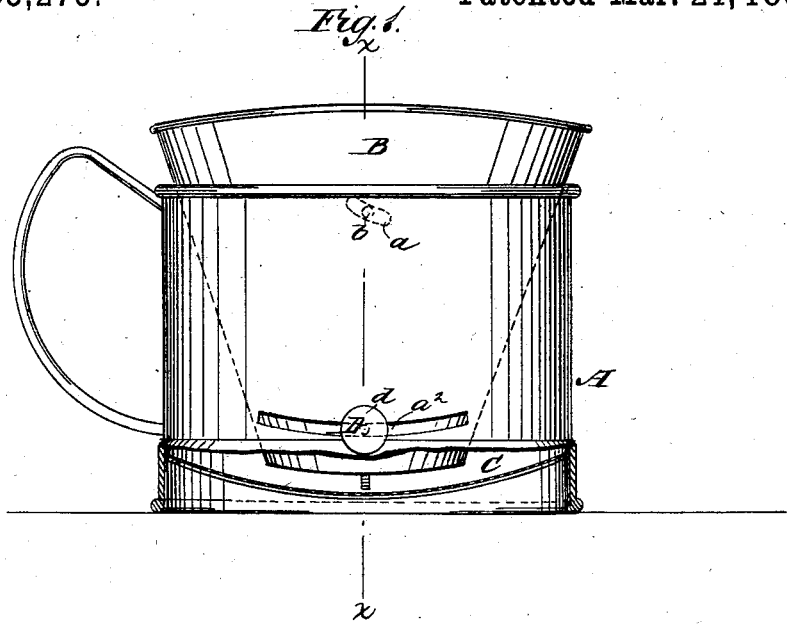
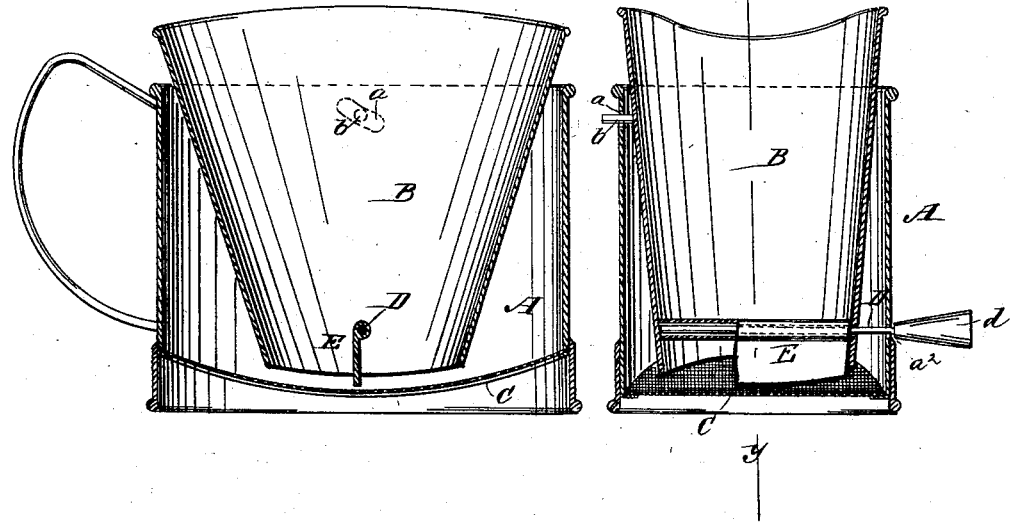
WITNESSES:
Francis McArdle.
C. Sedgwick.
INVENTOR:
A. J. Frank
BY Munn & Co
ATTORNEYS.

UNITED STATES PATENT OFFICE.

AUGUSTUS J. FRANK, OF WARSAW, ILLINOIS.

SIFTER.

SPECIFICATION forming part of Letters Patent No. 255,275, dated March 21, 1882.

Application filed January 28, 1882. (No model.)

*To all whom it may concern:*

Be it known that I, AUGUSTUS JULIUS FRANK, of Warsaw, in the county of Hancock and State of Illinois, have invented a new and useful Improvement in Sifters, of which the following is a full, clear, and exact description.

The invention consists in a novel construction, arrangement, and combination of a cup or vessel provided with a sieve, an inner bottomless vessel or hopper provided with a scraper for stirring the material to be sifted, a shaker-rod, and other parts, hereinafter more particularly described.

Reference is to be had to the accompanying drawings, forming a part of this specification, in which similar letters of reference indicate corresponding parts in all the figures.

Figure 1 is a side view, partly in section. Fig. 2 is a vertical section taken in the line $x$ $x$ of Fig. 1. Fig. 3 is a vertical section taken in the line $y$ $y$ of Fig. 2.

A is a vessel or cup, having in the lower part a sieve, C, preferably of a curved form, as shown in the drawings, forming an arc of a circle the radius of which is equal to the distance between the sieve and the slot $a$. The vessel A may have a handle, as shown, and may or may not, as preferred, have a bottom beneath the sieve C.

In the upper part of one side of the vessel A is a curved slot, $a$, having its convex side down and inclined from a horizontal line, as shown. In the opposite side of the vessel A, but lower down, near the sieve, is a curved slot, $a^2$, longer than the slot $a$, also having its convex side down.

B is a funnel-shaped vessel or hopper fitting loosely in the vessel A, and supported by the stud $b$ and the shaker-rod D, which have bearings respectively in the slots $a$ and $a^2$. The shaker-rod D is provided with a knob or handle, $d$, and can be drawn out from its socket in the hopper B when it is desired to remove said hopper.

E is a scraper attached to the hopper B near the bottom, for the purpose of sweeping the flour or other material over the sieve, as hereinafter described.

The method of operating my invention is as follows: The flour or other material to be sifted is poured into the hopper B and falls upon the sieve. The shaker-rod D is then moved with a reciprocating motion through the slot $a^2$. The arrangement of the shaker-rod is such that when said rod is reciprocated in the slot $a^2$ the hopper B, carrying the fixed scraper E, has imparted to it by the movement of pin $b$ within the inclined slot $a$ a peculiar wabbling motion, causing the hopper, with its contents, to be raised bodily from one side and jarred, whereby its contents are thoroughly shaken, and the sieve C being positioned so that the lower edge of the scraper shall always move just above or over it, the flour or other comminuted substance will be rapidly and thoroughly distributed and sifted.

To remove the hopper B the shaker-rod D is withdrawn and the sides of the hopper are pressed toward each other until the stud $b$ slips out of the slot $a$.

Having thus described my invention, I claim as new and desire to secure by Letters Patent—

1. The combination, with a vessel, A, provided with a sieve, C, of a tapering bottomless hopper, B, adapted to receive the material to be sifted, and arranged to oscillate inside of said outer vessel, substantially as and for the purpose herein described.

2. The combination of the outer vessel, A, provided with the sieve-bottom C and the slots $a$ and $a^2$, and the inner vessel, B, provided with the scraper E, and the stud $b$, and shaker-rod D, substantially as and for the purpose shown and described.

3. The combination of the curved sieve-bottom C of the vessel A and the scraper E, carried by the inner vessel or oscillating hopper, B, arranged and operating as herein shown and described.

4. The combination of the curved slots or guides $a$ $a^2$ with the stud $b$ and the shaker-rod D, provided with the knob or handle $d$, as shown and described, for the purpose specified.

AUGUSTUS JULIUS FRANK.

Witnesses:
GEORGE BOSCOW,
C. E. SCHILLING.